(No Model.) 6 Sheets—Sheet 1.

EXLEY WOODCOCK, Sr., N. O. WOODCOCK &
EXLEY WOODCOCK, Jr.
APPARATUS FOR DYEING.

No. 511,985. Patented Jan. 2, 1894.

Witnesses
Inventors: E. Woodcock Senior
N. O. Woodcock
E. Woodcock Junior
Attorney

THE NATIONAL LITHOGRAPHING COMPANY,
WASHINGTON, D. C.

(No Model.) 6 Sheets—Sheet 3.

EXLEY WOODCOCK, Sr., N. O. WOODCOCK & EXLEY WOODCOCK, Jr.
APPARATUS FOR DYEING.

No. 511,985. Patented Jan. 2, 1894.

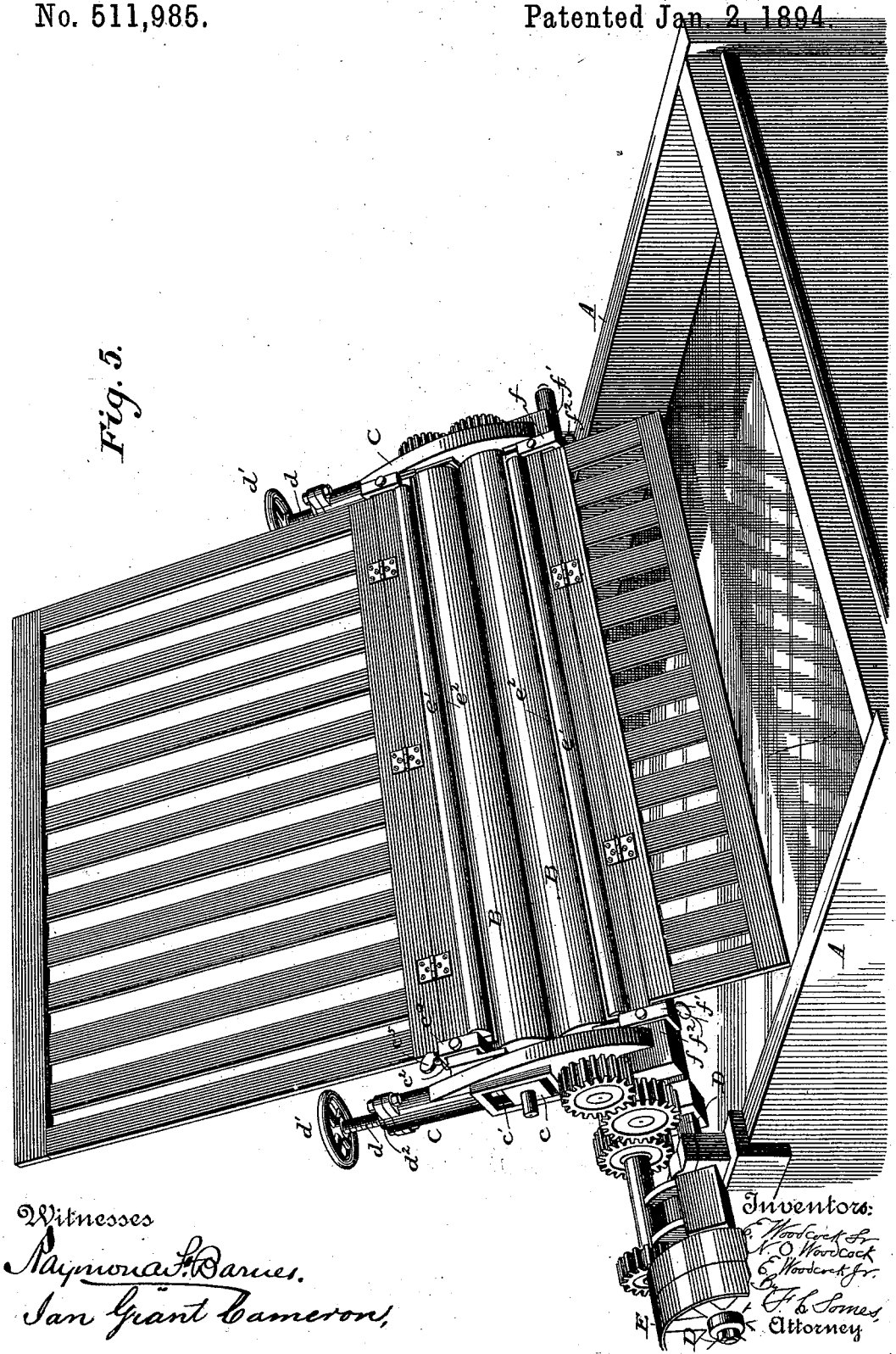

(No Model.) 6 Sheets—Sheet 5.
EXLEY WOODCOCK, Sr., N. O. WOODCOCK & EXLEY WOODCOCK, Jr.
APPARATUS FOR DYEING.
No. 511,985. Patented Jan. 2, 1894.
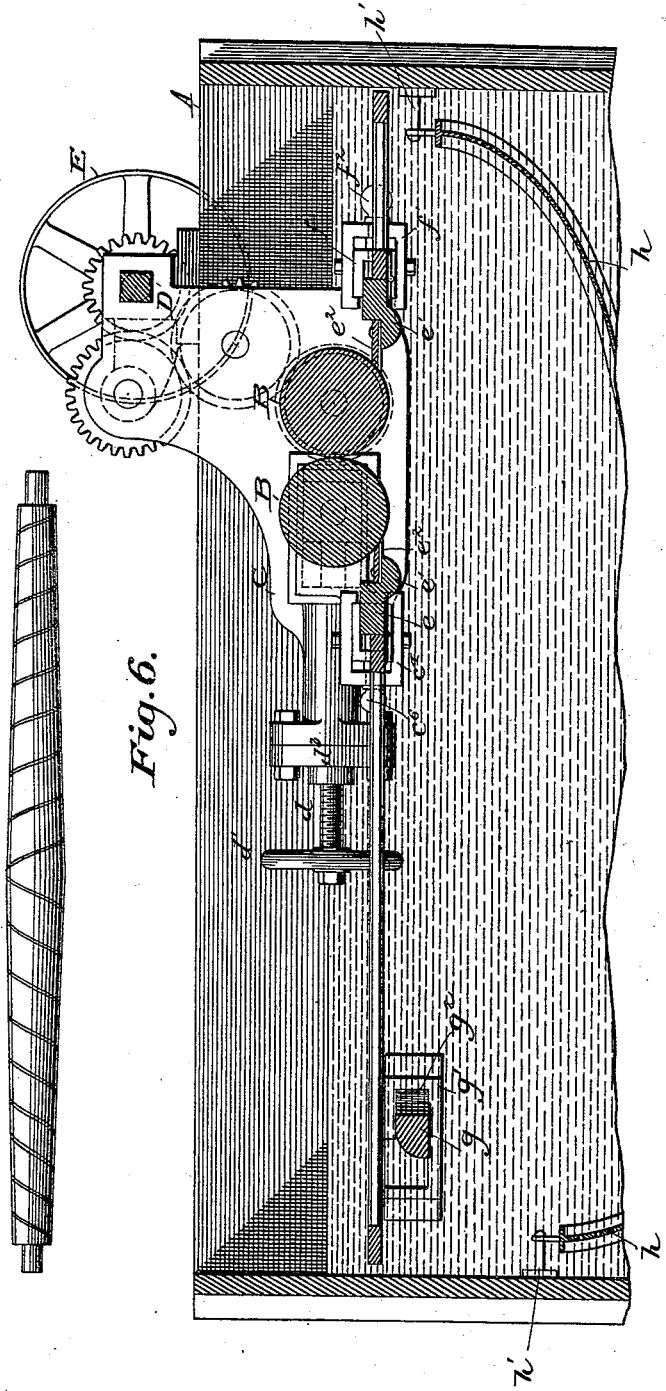
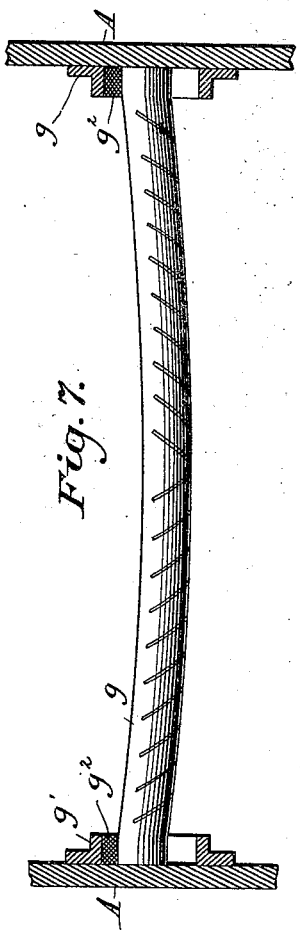

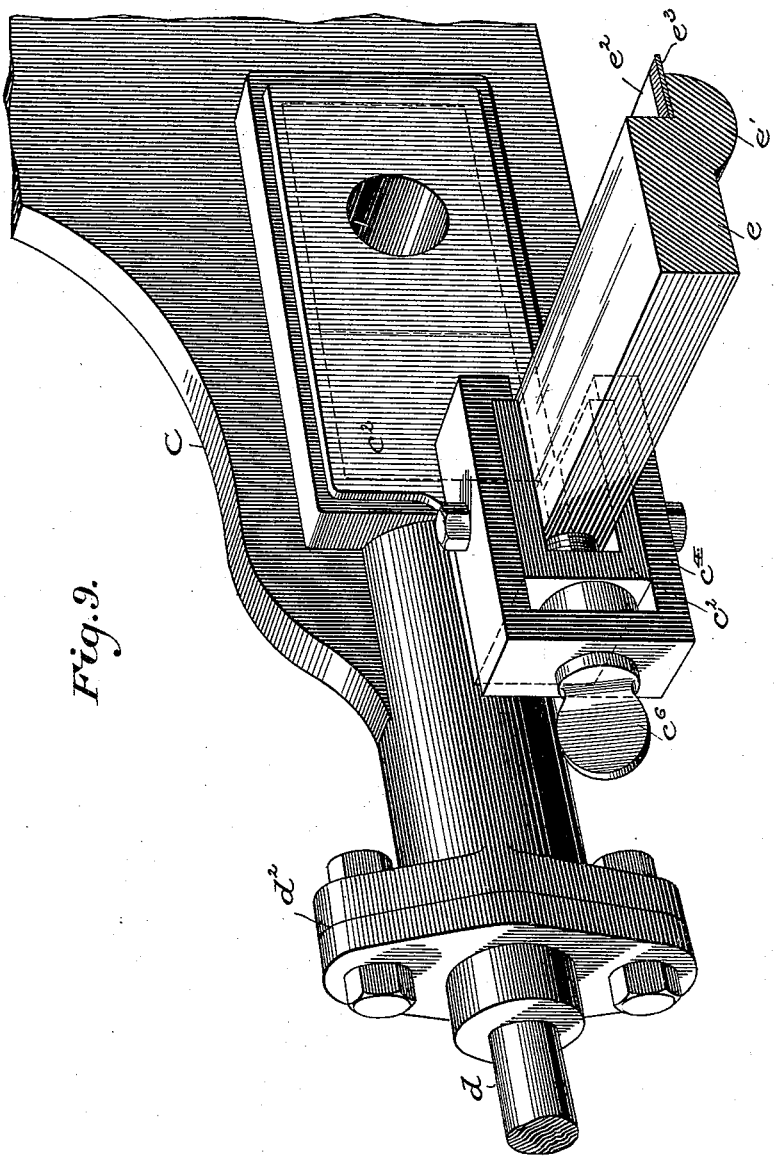

United States Patent Office.

EXLEY WOODCOCK, SR., NELSON OATES WOODCOCK, AND EXLEY WOODCOCK, JR., OF HUDDERSFIELD, ENGLAND.

APPARATUS FOR DYEING.

SPECIFICATION forming part of Letters Patent No. 511,985, dated January 2, 1894.

Application filed February 24, 1892. Serial No. 422,689. (No model.)

*To all whom it may concern:*

Be it known that we, EXLEY WOODCOCK, Sr., dyer, NELSON OATES WOODCOCK, dyer, and EXLEY WOODCOCK, Jr., student, all subjects of the Queen of Great Britain, and all residents of Hillhouse, Huddersfield, England, have invented certain new and useful Improvements in Dyeing-Machines, of which the following is a specification, reference being made to the accompanying drawings.

Our invention relates to dyeing machines chiefly applicable for indigo dyeing of the kind or class described in the specification of British Letters Patent No. 3,223 of 1870 as subsequently improved by the inventions described in the specifications of British Letters Patent No. 1,096 of 1877 and No. 1,482 of 1886.

Our invention comprises improvements in the manner of mounting the scrapers; and in means for preventing the fabric collecting at the sides of the machine during its travel to the nipping rollers.

Figure 1:
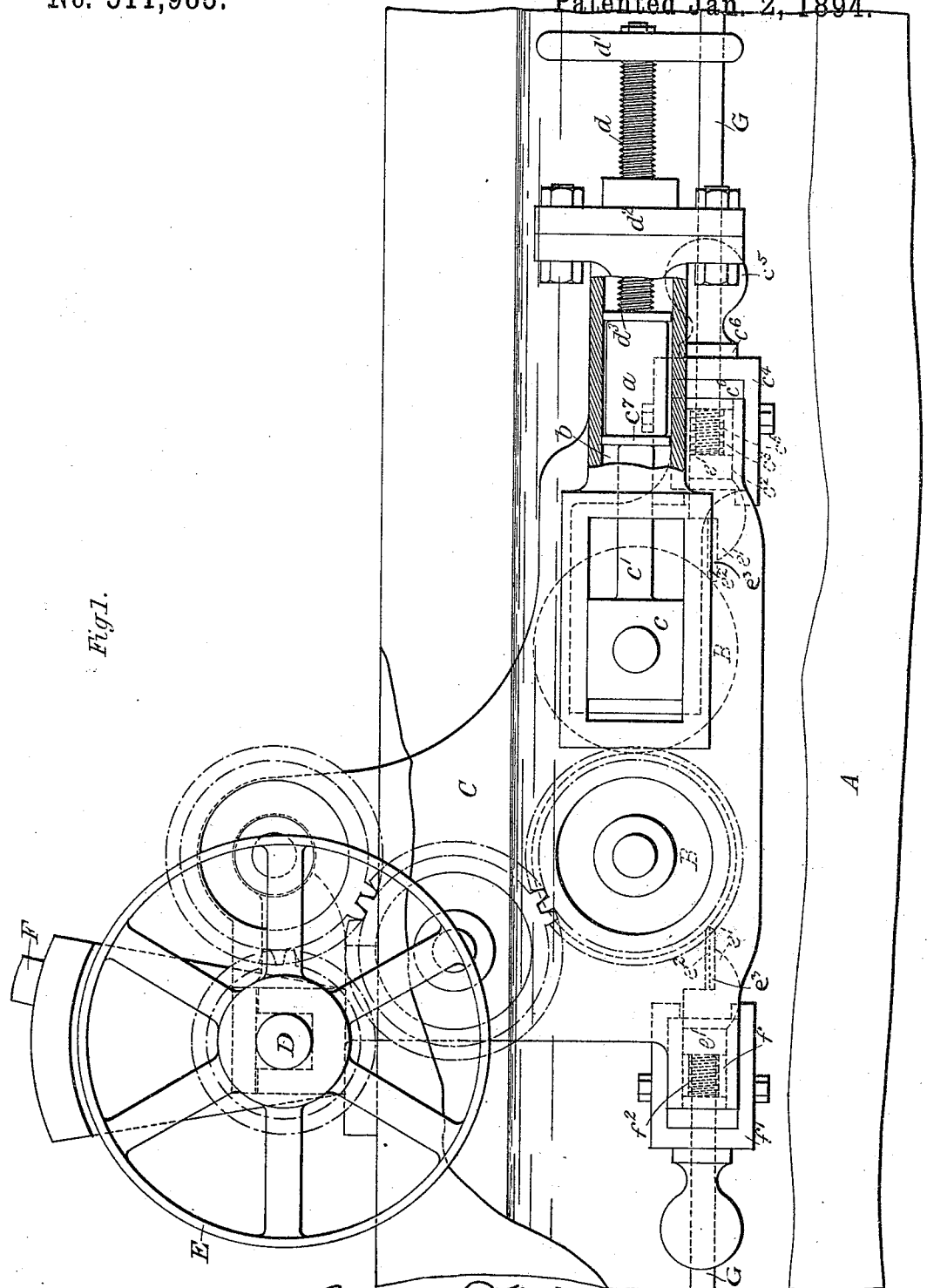
Figure 2:
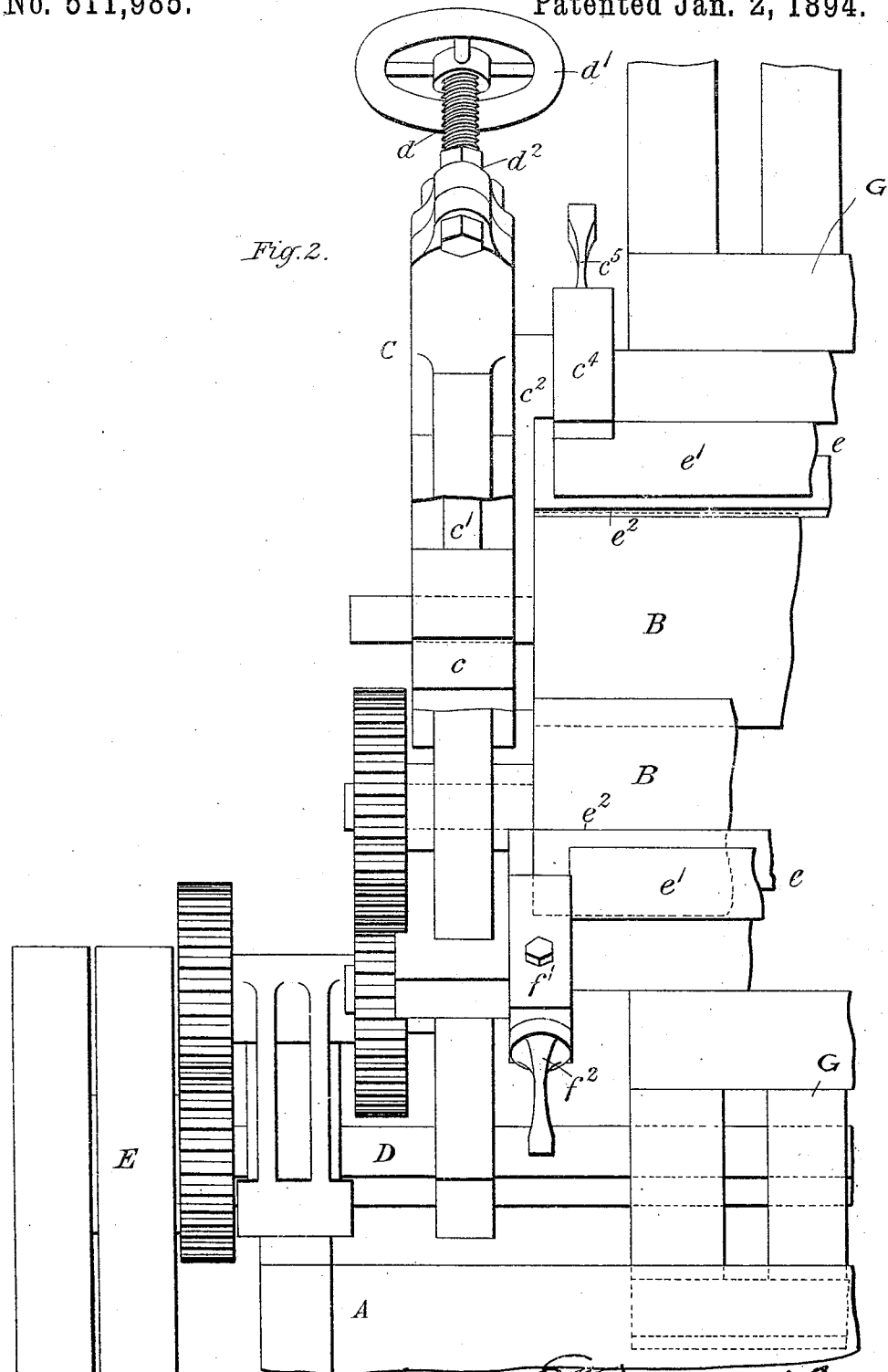
Figure 3:
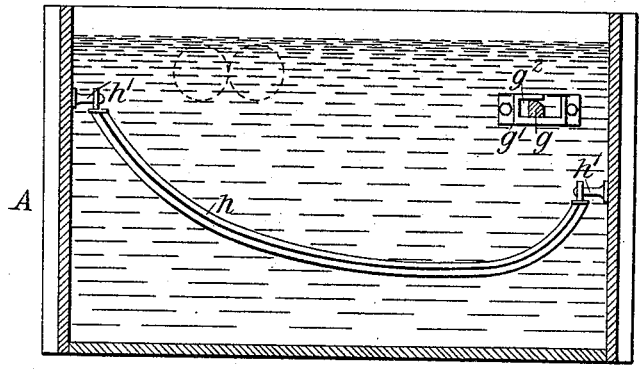
Figure 4:
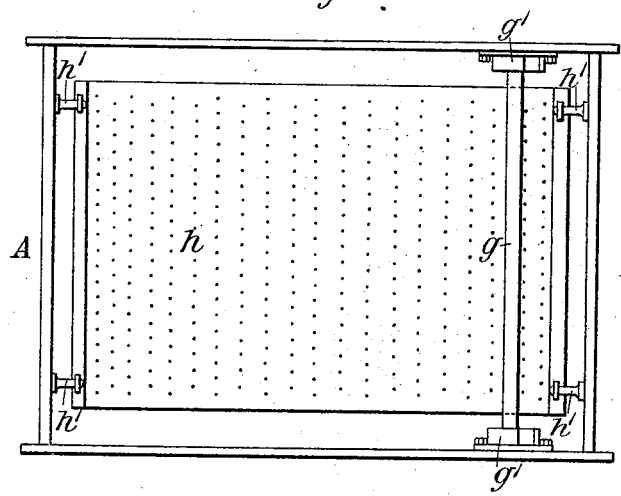

Referring to the drawings accompanying this specification, Figure 1 is a side elevation of the rollers; their bearing frames, partly in section; mechanism connected therewith, and a portion of the vat of a "Hawking" machine having our present improvements applied thereto. Fig. 2 is a front elevation of one end of the same, the rollers being raised out of the dyeing liquor into the position they occupy when not in use. Fig. 3 is a longitudinal sectional view on a reduced scale of the dyeing vat and the front guide bar and trammel hereinafter described. Fig. 4 is a plan view of the parts shown in Fig. 3. Fig. 5 is a perspective view of a machine embodying the invention, the side frames being elevated so as to lift the rollers and the scrays out of the vat. Fig. 6 is a longitudinal section of the vat, the lower portion of the latter being broken away. Fig. 7 is a detail view of the guide cross piece for the fabric, showing the relative position of the supports therefor and the elastic cushions. Fig. 8 is a detail view of a modified form of cross piece, being a roller. Fig. 9 represents a detail view of the mechanism for adjusting a scraper in unison with the adjustment of a nipping roll.

Like letters of reference indicate corresponding parts throughout the drawings.

A is the tank or vat containing the indigo dye.

B B are the ordinary rollers, mounted in side frames C, C which are pivoted on the bar D extending across the vat.

E is the driving pulley which is connected as heretofore by gearing with one of the rollers B.

F is the arm for a balance weight for balancing the rollers and frames about the bar D, and G G are scrays or frames for preventing the fabric from rising to the surface of the liquor.

For pressing the nipping rollers together rubber buffers or springs $a$, are placed in barrels $b$ of tubular or other suitable form mounted on the said frames C. The bearing blocks $c$ of the movable nipping roller are formed with shanks $c'$ which are constructed to slide in the said barrels $b$ and bear against plates $c^x$ placed between the said shanks and the buffers $a$.

$d, d$ are adjusting screws provided with hand wheels $d', d'$, and arranged to screw through screw threaded caps $d^2, d^2$ fixed on the frames C. A shoe $d^3$ is placed between the end of each screw $d$ and the buffer $a$ to distribute the pressure on the latter.

It is obvious that by operating the screws $d$ the pressure on the buffers $a$ can be increased or diminished and consequently the pressure between the rollers can be adjusted to suit any requirements.

Our scrapers are constructed of such materials as will resist the action of the hot liquor and not be liable to damage the fabric that is being dyed, and our said scrapers when properly adjusted will so act as to render it practically impossible for the fabric to get between them and the rollers. The scrapers each comprise the backs $e'$ which are made of iron or other suitable metal and the faces $e^2$ of which are composed of strips of brass or copper, or other metal not liable to be affected by the dye liquor. The edges of the said strips are made smooth so as not to damage the fabric. We sometimes insert between the metal back $e'$ and the copper or like strip $e^2$ a strip of india-rubber $e^3$ or other suitable elastic substance which, when the two metal pieces are screwed or otherwise secured together, will project slightly and form the lip of the scraper. This lip being elastic may be set to press upon the roller without causing undue friction and without damage to the fabric. The scrapers are arranged approximately horizontally and below the center of the roller and we prefer that the said scrapers should meet the rollers tangentially or nearly so. This is clearly shown in Fig. 1. We also hinge to the scrapers the "scrays" G G for keeping the fabric from rising to the surface of the liquor, thus avoiding the use of a separate movable cross-piece for supporting the said "scrays."

We make our improved scrapers adjustable toward and from the rollers as follows, that is to say we provide guide ways in which the backs $e'$ may slide. The scraper for the movable rollers should of course be mounted on the said roller bearings; otherwise it would require to be adjusted each time the roller is moved. We therefore construct the bearing blocks $c$ with extensions $c^2$ in which are formed the guide ways $c^3$ for carrying the scraper. $c^4$, $c^4$ are movable clips or bridge pieces which can be applied to and removed from the parts $c^2$ of the said bearing blocks, and $c^5$, $c^5$ are screws mounted in the said bridge pieces, and constructed with collars $c^6$, $c^6$ arranged to engage with the bridge pieces to prevent longitudinal movement of the screws therethrough while permitting rotary movement of the said screws. The screws $c^5$ are arranged to screw into the parts $e'$ of the scrapers so that by rotating the screws the scrapers can be adjusted toward and from the roller. Since the scraper is mounted in slides formed in the bearing blocks of the movable roller, it follows that any movement of the said roller carries the scraper with it and hence the scraper does not require re-adjustment each time the roller is moved. This combination of movable roller and scraper forms an important feature of our invention. The scraper for the other roller is mounted in guideways $f$ in the side frames C, C, and is adjusted therein by clips or bridge pieces $f'$ and screws $f^2$ similar to the clips or bridge pieces $c^4$ and screws $c^5$ above described.

This class of machine as heretofore constructed is provided with a cross-piece, arranged in the vat, to act as a guide for conducting the fabric to the nipping rollers. It is found in practice that the fabric does not keep to the center of this cross-piece but tends to collect at the sides thereof and is thus liable to be damaged between the rollers. It has heretofore been necessary to keep the fabric stretched to its full width on the said cross-piece by hand which is objectionable. To avoid this practice we according to our present invention mount the said cross-piece so that either end thereof is capable of movement toward the nipping rollers independently of the other end. $g$ Figs. 3, 4, 6, 7, and 8 is the said cross-piece or guide supported so as to be capable of sliding in bearing pieces $g'$ fixed to the sides of the vat. $g^2$ is a rubber or like soft elastic cushion provided in each bearing piece $g'$ for the said cross-piece $g$ to press against. When the fabric tends to collect at one end of the cross-piece $g$ the extra pull of the cloth caused thereby drags that end of the cross-piece toward the nipping rollers. Immediately the said cross-piece assumes a position other than parallel with the nipping rollers, the pull of the fabric is greater on the most distant end of the said cross-piece and therefore the fabric is pulled to the center of the cross-piece again and the said cross-piece resumes its proper position parallel with the nipping rollers. Adjustable metal or other plates may be provided in the guides for the purpose of regulating the pressure on the elastic packing and the position of the slides. The said cross-piece may be made straight with a rounded edge if desired, as shown in Figs. 3 and 4, but we prefer to make it curved, with its convex edge away from the nipping rollers, as shown in Fig. 7, and to insure the fabric being stretched to its full width we form in the said curved surface spiral grooves $g^3$ into which we may insert strips of india-rubber or the like. These grooves $g^3$ or the rubber pieces therein act to stretch the fabric laterally. We sometimes employ a roller $g^4$ over which we conduct the fabric in lieu of the cross-bar $g$ as shown in Fig. 8. This roller $g^4$ may be cylindrical throughout its length or it may be of a greater diameter at the center than at its ends and we may form spiral grooves from the center to the ends of this roller for the purpose above specified. The said roller may be mounted in any suitable manner to permit of its having the same movement as the aforesaid cross-piece.

We prefer to provide in the dye vat a trammel for supporting the cloth, consisting of a perforated metal sheet $h$. The said sheet is supported by hooks $h'$ at the front and back of the vat and is suitably curved as shown most clearly in Fig. 3 so that the cloth will slide thereon with very little friction. A trammel so constructed will cause less friction than the trammels heretofore employed and will therefore enable the machine to be worked with less expenditure of power.

The scrays G, G, are slatted frames preferably of wood, which are hinged at their inner ends to the backs of the scrapers, as shown most clearly in Fig. 5.

What we claim is—

1. In a dyeing machine, the combination of two adjustable nipping rolls adapted to co-act upon the cloth to be dyed, and scrapers adapted to contact with said nipping rolls, said scrapers being mounted in connection with the bearings of the nipping rolls whereby they retain their relative position to said rolls when the latter are adjusted.

2. In a dyeing machine, the combination of two adjustable nipping rolls adapted to co-act upon the cloth to be dyed, and adjustable scrapers adapted to contact with said nipping rolls, said scrapers being mounted in connection with the bearings of the nipping rolls whereby they retain their relative position to said rolls when the latter are adjusted.

3. In a dyeing machine, the combination of a nipping roller a scraper and a scray hinged to said scraper.

4. The combination of a dye vat for containing a dye liquor a pair of nipping rolls disposed in said vat, a transverse cloth guide disposed in said vat at some distance from said rolls, a curved perforated trammel disposed in said vat and extending between said rolls and guide, substantially as set forth.

5. The combination with a dyeing mechanism of a guide bar for the cloth, said guide bar having spring bearings which permit of a slight variation of the relative position of said guide bar to the rollers of the machine.

6. In a dyeing machine, the combination of a dye vat, a pivoted frame mounted thereon, a pair of nipping rolls, movable journal blocks in which one of said rolls has its bearing, barrels mounted on said frame opposite said journal blocks, buffers inclosed in said barrels, said journal blocks having extensions projecting into said barrels, and adjusting screws in the outer ends of said barrels for adjusting the pressure of said buffers on said extended journal blocks, substantially as set forth.

In testimony whereof we have hereunto signed our names in the presence of two subscribing witnesses.

EXLEY WOODCOCK, Sr.
NELSON OATES WOODCOCK.
EXLEY WOODCOCK, Jr.

Witnesses:
JAMES W. TAYLOR,
NORRIS SYKES.